Patented Dec. 10, 1935

2,023,973

UNITED STATES PATENT OFFICE 2,023,973

GLUE AND GLUE BASE

Gordon G. Pierson, Lansdale, Pa., assignor to Perkins Glue Company, a corporation of Delaware No Drawing. Application October 4, 1934, Serial No. 746,845

12 Claims. (Cl. 134—23.4)

This invention relates to adhesives and particularly to glue made from corn starch having the necessary strength and other properties for use in the woodworking industry.

This application is a continuation in part of my application Ser. No. 679,546, filed July 8, 1933.

Glue that I have heretofore made of corn has possessed the objectionable property of jelling, that is, losing its fluidity on standing. When such glue jells, the glue cannot be satisfactorily handled in commercial mixing, piping and spreader systems. I have found that this jelling can be prevented at least to some extent by increasing the amount of solvent for the glue, ordinarily aqueous caustic soda solution. It has been found, however, that such increase in the solvent does not prevent the thickening but only delays it unless the amount of water and alkali required has been too great to provide a commercial glue suitable for gluing wood. Barium peroxide or similar oxidizing agent has been proposed and used heretofore for liquefying starch glues, as set forth in the applications of Ellery H. Harvey, Ser. Nos. 589,549/50, each filed September 21, 1922, and Ser. No. 615,151 filed January 26, 1923. It has also been recognized that fillers can be used to reduce the water content of the glue, but the larger the amount of filler the greater the wear on machine cutting tools employed in shaping and otherwise cutting the glued wood. Although it is known that cassava starch glues converted by caustic alkali can be neutralized by the addition of acid and will remain in unjellied condition for some time, so far as I am aware it has never been possible to convert corn starch by caustic alkali and obtain a neutral glue because upon neutralization the converted corn starch jells substantially immediately.

The principal object of this invention accordingly is to produce a commercial glue base and glue therefrom, from corn starch which may be satisfactorily handled in commercial mixing, piping and spreader systems, and which shall be resistant to the objectionable thickening tendency on standing. Another object of the invention is to produce a glue of this type which may have a low water content. Another object of the invention is to provide a partially or completely neutralized corn starch glue which will remain fluid for relatively long periods.

The invention comprises the novel products, the specific embodiments of which are described hereinafter by way of examples and in accordance with which I now prefer to practice the invention.

I have found in accordance with this invention that corn starch, a urea or its equivalent in combination with an oxidizing agent will produce a commercial corn starch glue. The glue base preferably contains from about 3 to about 10% of urea or equivalent based on the weight of the dry glue base. The barium peroxide or similar material is used in proportion of about 0.4 to about 1.5% of barium peroxide or equivalent of other similar material based on the weight of the dry glue base. The glue base is converted by bursting the starch with water and caustic soda. It forms a commercially satisfactory glue which resists jelling and which may have a low water content. Urea as here employed acts as a bursting agents for the starch as well as a liquefying and stabilizing agent. In these respects its effect is similar to caustic soda and since urea is a near neutral agent, it can be partially substituted for caustic soda, which is a strong alkali; thereby reducing the causticity of the resulting glue. Barium peroxide acts as a strong liquefying agent. Barium and other peroxides are capable of giving off oxygen under reaction conditions as is well-known. Caustic soda employed is a bursting, liquefying and stabilizing agent and is especially effective as a stabilizer. It is important to use sufficient caustic soda so that the glue will resist thickening on standing. I mean by the words "liquefying agent" an agent for bringing about a reduction of the viscosity or water-absorptive capacity of the glue base. By "stabilizing agent" I mean an agent for preventing or retarding thickening action in the prepared glue. By "bursting agent" I mean an agent which acts initially to break down the starch granules and expose the interior as well as the exterior of these granules to reaction with other ingredients of the composition.

In addition the urea appears to retard the initial tendency of the water to leave the glue by evaporation into the air or penetration into the wood on which it is spread. In the case of corn starch glue, which has a somewhat higher content of water than cassava starch made in accordance with my copending application Ser. No. 679,546 mentioned above, the amount of urea is ordinarily kept lower than the amount used with cassava since the corn starch glues do not tend to evaporate rapidly with their higher water content.

In actually using the corn starch glues, I preferably prepare a dry base which may be stored and shipped to the consumer for conversion by the latter. This base contains the urea, peroxide and any other desired ingredients mentioned more specifically in the examples below. The conversion comprises the addition of aqueous caustic alkali with or without heat. Caustic soda may be replaced in part by carbon disulphide which is added to the cooled mixture after conversion or carbon disulphide may be added at the time of conversion if conversion takes place cold.

The following are specific examples of the invention which are to be considered as illustrative and not to be construed in a limiting sense:—

*Example 1.*—The glue is made with the following ingredients, the proportions noted being by weight. I take about 88.5 to about 96.6 parts of corn starch, about 3 to about 10 parts of urea, about 0.4 to about 1.5 parts of barium peroxide. These chemicals excepting urea are preferably used in finely divided condition. Urea is preferably not finely divided but in the form of small grains or lumps and is the type known on the market as fertilizer grade. This mixture constitutes the dry glue base. The base is converted by adding to 100 parts of the base about 180–215 parts of water, containing about 7 to about 10 parts of caustic soda. The mixture is then heated to 160° F. and stirred until converted. The converted glue when at the temperature of conversion has a viscosity of about 10,000 centipoise and when cooled to 80° F. has a viscosity of about 60,000 centipoise.

*Example 2.*—The glue is made with the following ingredients, the proportioins noted being by weight. I take about 88.5 to about 96.6 parts of corn starch, about 3 to about 10 parts of urea, about 0.4 to about 1.5 parts of barium peroxide. These chemicals excepting urea are preferably used in finely divided condition. Urea is preferably not finely divided but in the form of small grains or lumps and is the type known on the market as fertilizer grade. This mixture constitutes the dry glue base. The base is converted by adding to 100 parts of the base about 180 to about 215 parts of water containing about 4 to 6 parts of caustic soda and 0.5 to 3 parts of carbon disulphide. The mixture is then heated to 160° F. and stirred until converted. The glue obtained has a similar viscosity to that mentioned in Example 1.

*Example 3.*—The glue is made with the following ingredients, the proportions noted being by weight. I take about 92 to about 73 parts of corn starch, about 3 to about 10 parts of urea, about 4.6 to about 15.5 parts of whiting, about 0.4 to about 1.5 parts of barium peroxide. These chemicals excepting urea are preferably used in finely divided condition. Urea is preferably not finely divided but in the form of small grains or lumps and is the type known on the market as fertilizer grade. This mixture constitutes the dry glue base. The base is converted by adding to 100 parts of the base about 180–215 parts of water, containing about 7 to about 10 parts of caustic soda. The mixture is then heated to 160° F. and stirred until converted. The converted glue when at the temperature of conversion has a viscosity of about 10,000 centipoise and when cooled to 80° F. has a visosity of about 60,000 centipoise.

*Example 4.*—The glue is made with the following ingredients, the proportions noted being by weight. I take about 88.5 to about 96.6 parts of corn starch, about 3 to about 10 parts of urea, about 0.4 to about 1.5 parts of barium peroxide. These chemicals excepting urea are preferably used in finely divided condition. Urea is preferably not finely divided but in the form of small grains or lumps and is the type known on the market as fertilizer grade. This mixture constitutes the dry glue base. The base is converted by adding to 100 parts of the base about 180 to about 215 parts of water containing about 4 to 6 parts of caustic soda, after which about 0.5 to 3 parts of carbon disulphide is added. After preparation of the glue, the alkalinity is neutralized completely or partially by adding up to 10 pounds of acetic acid or up to 10 pounds of ammonium chloride or ammonium sulphate.

The viscosity of 60,000 centipoise is the preferred viscosity for commercial use. In glues having about this viscosity, the proportions of urea and/or filler such as whiting may be somewhat increased with consequent lowering of the amount of starch and of the amount of water employed, but such changes are not ordinarily desirable because the increase in urea tends to prevent evaporation of water from the glue, and hence to increase the length of time required for drying. Increase in the proportion of whiting or other filler tends to increase the wear on cutting tools. If the water content in the above formulæ is lowered appreciably while keeping the other proportions the same, viscosity will increase and may become objectionably high.

In place of urea I may employ homologues or suitable derivatives thereof containing the

group. Instead of barium peroxide, I may use other similar oxidizing agents. If the peroxide is to be mixed with the glue base and shipped as such, it is important that it be a stable peroxide such as barium peroxide. If the peroxide is added in the converting kettle, it is not important that it be stable and hydrogen peroxide or other peroxides which would break down on storage could be used.

The whiting employed above has a stabilizing action on corn starch glues equivalent to approximately 2–4% of caustic soda. Instead of whiting, there may be substituted the following to give substantially this same stabilizing and other action:—powdered clay, iron oxide, diatomaceous earth, fuller's earth or the like. Soda ash may also be employed in small proportion, say about 0.1% of the total weight of the base, and aids in stabilizing the peroxide such as barium peroxide.

Other acids may be employed for neutralization such as sulphuric, oxalic or salicylic acids or ammonium salts such as the sulphate, oxalate, or carbonate. It is to be understood that in neutralizing the starch glue, the strength of the glue is reduced substantially when the amount of free caustic is reduced below 1%. I have found that it is important to have carbon disulphide present upon neutralizing the corn starch glues. When it is present corn starch glue made in accordance with the present invention may be neutralized with acids or nearly neutralized by ammonium salts and even made acid without gelatinization taking place for several hours at least.

Corn starch as it comes on the market is ordinarily in equilibrium as to its moisture content with the moisture of the atmosphere. In case the starch has not such an equilibrium, it is important that its moisture content be adjusted so that it is in equilibrium with the atmosphere to form a glue base which is substantially stable on storage for an indefinite period.

Glues made in accordance with the present invention when converted and applied in veneering and in the manufacture of plywood are less apt to stain the wood to which applied and less apt to cause checking of the wood than previously made starch glues. These corn starch glues resist the tendency to thickening as pointed out and can be commercially handled in commercial mixing, piping and spreader systems. This corn starch glue contains at the same time less water than any previously attempted corn starch glues. Urea in these compositions is substituted for a portion of the starch. Urea is a non-viscous highly soluble material and accordingly permits a substantial reduction of the water requirements of the glue base. Urea acts as a liquefier and stabilizer and serves also to retard evaporation of water from the glue after its application to an object to be glued.

While the invention has been described in detail with respect to certain preferred examples thereof which give satisfactory results, it will be understood by those skilled in the art after understanding the invention, that various changes and modifications may be made without departing from the spirit and scope of the invention and it is intended therefore in the appended claims to cover all such changes and modifications.

What I claim as new and desire to secure by Letters Patent is:—

1. A glue base consisting of corn starch in substantially dry powdered form containing an oxidizing agent adapted to release oxygen, and capable of liquefying said starch, but said starch being substantially unliquefied thereby, and a urea, said urea being adapted to serve as a liquefier and stabilizer and to retard evaporation of water from the glue after its application to an object to be glued.

2. A glue base consisting of corn starch in substantially dry powdered form containing a peroxide without being converted by said peroxide, and urea, said urea being adapted to serve as a liquefier and stabilizer and to retard evaporation of water from the glue after its application to an object to be glued.

3. A glue base consisting of corn starch in substantially dry powdered form mixed with urea about 3 to 10 parts by weight of the total base, and barium peroxide in proportion of about 0.4 to 1.5 parts by weight of the total base.

4. A glue base consisting of corn starch in substantially dry powdered form mixed with urea about 3 to 10 parts by weight of the total base, barium peroxide in proportion of about 0.4 to 1.5 parts by weight of the total base, and a filler in proportion of about 4.6 to 15.5 parts of the total base.

5. A glue base according to claim 2 combined with a filler selected from the group consisting of whiting, kaolin or similar clay, fuller's earth or diatomaceous earth.

6. A glue prepared from a base consisting of corn starch, an oxidizing agent adapted to give off oxygen and capable of liquefying said starch, a urea, and caustic alkali in water in sufficient quantity to dissolve said base to form a glue applicable for gluing ply-wood, bent-wood and the like.

7. A glue containing the products of reaction of corn starch, a peroxide, a urea dissolved in caustic alkali and water in a ratio of not more than about 2.15 parts of water to 1 part of glue base forming a glue having a viscosity of about 60,000 centipoise adapted for gluing ply-wood, bent-wood and the like.

8. A glue containing the products of reaction of corn starch in the proportion of about 88.5 to about 96.6 parts by weight, barium peroxide about 0.4 to about 1.5 parts by weight, and urea about 3 to about 10 parts by weight dissolved in water in a ratio of about 180 to about 215 parts of water to 100 parts of base containing about 7 to 10 parts of caustic soda.

9. A glue prepared according to claim 6 in which a portion of the caustic alkali is replaced by carbon disulphide.

10. A glue prepared from a base of corn starch about 92 to about 73 parts mixed with urea about 3 to 10 parts, barium peroxide about 0.4 to 1.5 parts and a filler about 4.6 to 15.5 parts, converted with about 7 to 10 parts of caustic soda in 180 to 215 parts water, all parts by weight.

11. A starch glue prepared with alkali but neutralized partially or wholly or even slightly acidified by the neutralizing agent but having considerable resistance to thickening, prepared from corn starch, an oxidizing agent adapted to give off oxygen and capable of liquefying said starch, a urea, caustic alkali, carbon disulphide and water in sufficient quantity to dissolve said base to form a glue applicable for gluing plywood, bent-wood and the like.

12. A glue base according to claim 1 in which the moisture content of the corn starch is substantially in equilibrium with that of the atmosphere.

GORDON G. PIERSON.